Aug. 21, 1934.  O. LAUENSTEIN  1,971,314

MACHINE FOR THE MANUFACTURE OF CHOCOLATE

Filed April 23, 1932   3 Sheets-Sheet 1

Inventor:
O. Lauenstein
By: Marks & Clerk

Aug. 21, 1934.  O. LAUENSTEIN  1,971,314
MACHINE FOR THE MANUFACTURE OF CHOCOLATE
Filed April 23, 1932   3 Sheets-Sheet 3
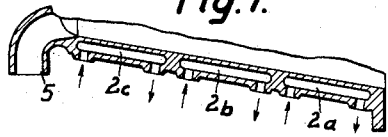
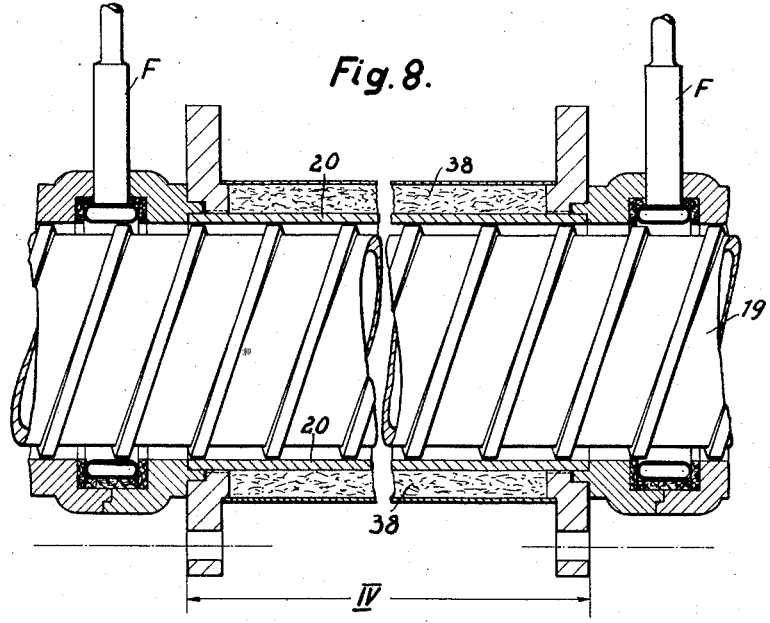
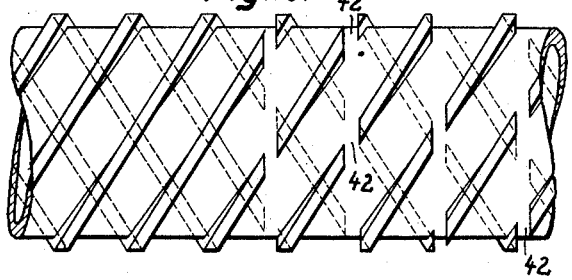
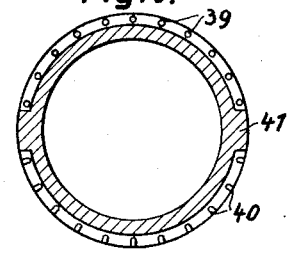
Inventor:
O. Lauenstein
By: Marks & Clerk
Attys.

Patented Aug. 21, 1934

1,971,314

UNITED STATES PATENT OFFICE 1,971,314

MACHINE FOR THE MANUFACTURE OF CHOCOLATE

Otto Lauenstein, Wernigerode-on-the-Harz, Germany

Application April 23, 1932, Serial No. 607,213
In Germany July 7, 1931

14 Claims. (Cl. 257—86)

This invention relates to a machine for tempering chocolate mass. Such machines consist substantially of a conveying member provided with helical grooves, which is continuously rotated with respect to a smooth wall.

According to the invention the helical grooves in the conveying member which remains close to the smooth wall are very shallow. The result of this is that the layer of chocolate conveyed by the conveying member is very thin, so that the layer can cool through in a uniform manner. In this constructional form the effect of the heat is still further improved through the fact that owing to the shallow depth of the helical grooves according to the invention the groove periphery is exceptionally greatly increased with respect to the cross-sectional area of the groove. This, however, greatly increases the resistance to material flowing in the reverse direction owing to the counterpressure, so that great counter pressures are overcome without appreciably diminishing the quantity conveyed. This is very important for the uniformity of the temperature obtained, as with any fluctuation in the quantity conveyed, the quantity of heat to be transmitted must of course also be varied, that is to say, the supply of cooling medium must be regulated. The slight depth of the helical grooves, that is the great increase in the periphery of the groove as compared with the cross-sectional area of the groove, results in a large cooling surface. This makes quick cooling possible.

The accurate regulation of temperature in the so-called tempering of the chocolate mass is extremely important, as experience has shown that even slight fluctuations in temperature of half a degree centigrade have a very detrimental effect on the further treatment of the chocolate.

The slight depth of the helical grooves, that is to say, the slight thickness of the layer of chocolate mass has the further effect that the mass conveyed by the helical grooves is not only fed forward as such, but also is in itself very thoroughly stirred and worked up over the whole thickness of the layer, so that the accuracy and uniformity of the temperature influence aimed at is still further increased.

A construction of the helical conveying member according to the invention has the further advantage that it renders superfluous the provision of a separate pump for the positive conveyance of the chocolate mass to be treated to the places where it is to be dealt with, which can thus be placed immediately at the delivery end of the tempering machine. The positive conveyance for the uniform delivery to the separate places is obtained through the very slight depth of the helical grooves in the worm according to the invention. In the worms hitherto used the conveyance against a resistance (accumulation) entails great difficulty, since with helical grooves of greater depth, that is to say, where the cross-sectional area of the grooves is relatively great as compared with the surface of the groove, the mass being conveyed can flow back in the longitudinal direction of the helical groove.

For further improving the influence of the temperature on the chocolate mass the layer is preferably cooled only or mainly at the smooth wall. This wall is continuously swept over by the helical grooves of the conveying member, so that the chocolate mass in cooling cannot stick to the wall and therefore cannot form lumps. The avoidance of the formation of lumps is extremely important. For obtaining a complete uniformity of the chocolate mass which is particularly necessary in the manufacture of the better qualities of chocolate.

Owing to the fact that the layer of chocolate is cooled only at the smooth wall swept over by the helical grooves it is possible to employ very low cooling medium temperatures, namely temperatures lying below the solidifying point of the chocolate mass without any danger that, through the solidifying of the mass at the cooling surface side, the uniform working of the machine will be detrimentally affected and that the homogeneity of the mass required for the better qualities will not be obtained. The employment of moderate cooling medium temperatures results in a correspondingly quick cooling and a correspondingly shorter overall length of the machine.

The accompanying drawings illustrate some constructional examples of the tempering machine according to the invention.

Figs. 2 and 7 are detailed sectional views showing further embodiments of the jacket of the conveying worm.

Fig. 8 shows another embodiment of the worm casing in which the end piece of the casing is surrounded by a covering of insulating material—instead of a jacket.

Figures 9 and 10 show another embodiment of the worm for increasing the frictional effect of the chocolate mass in the helical worm grooves.

Figure 1:
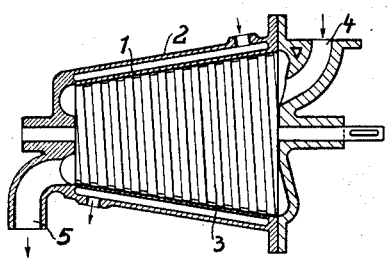
Fig. 1 is a longitudinal sectional view through the tempering machine.
Figure 2:
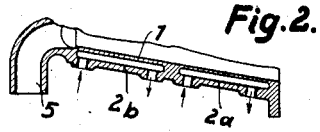

In the constructional form shown in Figs. 1 and 2, there is rotatable in an outer casing 1 provided with a cooling jacket 2 the conveying worm, namely a conical worm 3. The helical grooves lie close against the smooth inner surface of the wall of the casing and are of very shallow depth, namely from 2-9 mm. The chocolate mass comes from an elevated highly heated hopper and passes into the inlet branch 4 and from there into the helical groove of the worm 3. The latter conveys the chocolate mass in a very thin layer of from 2-9 mm. thickness along the smooth and externally cooled wall of the casing to the outlet branch 5. To the latter are connected the distributing pipes leading to the separate places where the chocolate is to be further treated (filling hoppers of the working up machine). From the branch 5 a return pipe 9 leads to the hopper. Any superfluous chocolate mass accruing through variations in the withdrawal is returned through this return pipe, whereby the counter-pressure at the outlet branch is kept constant. The cooling jacket 2 of the casing surrounding the worm may be divided (see Fig. 2) to enable the cooling effect along the path of the chocolate layer to be distributed as required in the longitudinal direction of the casing and to enable the chocolate to be heated up again if required. In this case the second part 2b of the cooling jacket would be supplied with a heating medium, such as hot water, steam or the like. The arrows shown in Fig. 2 indicate the inlet or outlet of the cooling or heating medium.

According to Figure 7 the jacket 2 may be divided into more than two parts. In Fig. 7 there are shown three parts 2a, 2b, 2c; the last part 2c will be supplied with a heating medium and the parts 2a and 2b may be supplied with a cooling medium, for instance, in such a manner that the chocolate while flowing along the first part 2a will be cooled considerably and while flowing along the second part 2b will be slightly cooled The reheating of the chocolate mass in the second part of its path through the temperature machine, after being cooled down in the first part to below the temperature at which it is to be used has been found to be extremely useful for influencing the flavour of the chocolate. Hitherto for this purpose a considerable quantity was cooled as a whole and subsequently heated again as a whole. In contradistinction thereto in the device according to the invention this operation of reheating can be carried out continuously through the end portion of the conveyed layer being heated. This results in a great simplification of the machine and also in a very simple operation. When the conveying worm is made with helical grooves of very slight depth the provision of a heating jacket for reheating the chocolate layer in the last part of its path through the tempering machine can be avoided according to the invention by the end portion of the conveyed layer being protected against heat radiation. The protection may be obtained in a different manner. For instance as shown in Fig. 8 the end portion IV of the worm casing 20 is covered by a heat insulating material 38 of a known kind. The insulating material is surrounded, in this instance, by an envelope of sheet-metal. Instead of such an insulating cover, there may be provided for the end portion a jacket like those of the first part of the machine, fully described hereinafter with reference to Fig. 5. The jacket of the end portion is supplied by a medium of suitable temperature for preventing partly or completely a radiation of the heat generated by friction of the chocolate mass in the grooves of the worm thread. In this case if the reheating of the mass by the friction exceeds the desired delivery temperature the end portion may be slightly cooled by decreasing the temperature, of the medium flowing through the jacket of the end portion. Likewise it is possible to slightly heat the end portion by increasing the temperature of the medium flowing through the jacket of the end portion, in case the heat generated by friction is not sufficient to reach the desired delivery temperature. Besides the automatic reheating from within owing to the friction of the mass in the very shallow helical grooves, a very perfect automatic temperature regulation is obtained. It has been found that with such an end portion the final temperature of the chocolate mass leaving the tempering machine, that is, the time required for the next operation, can be maintained far more easily and accurately than when a heating jacket is employed.

Figure 4:
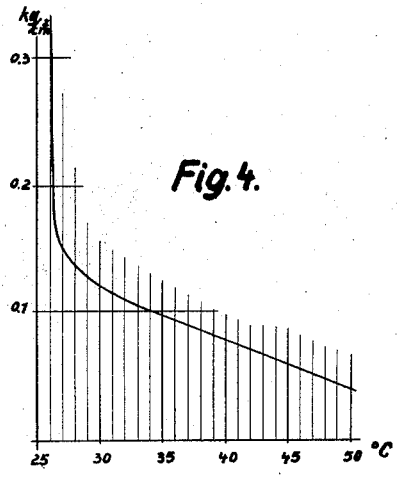
Fig. 4 is a diagram showing the resistance to flow of the chocolate mass as function of the temperature of the mass.

The accurate automatic temperature regulation in this frictional end piece can be accounted for as follows:

The temperatures in this end piece which serves for the slight reheating of the chocolate mass after being cooled down below the temperature required for the next operation lie approximately between 27 and 29° C. As will be seen from the diagram in Fig. 4 the resistance to flow and consequently the internal friction of the chocolate mass vary very greatly within a small range of temperature. Consequently if the temperature of the end piece falls only slightly the resistance to flow of the chocolate mass will increase to such an extent that, owing to the increased friction due to the increased resistance to flow and the consequent greater generation of heat, the desired temperature is obtained, while conversely should the chocolate become too highly heated, the resistance to flow will decrease considerably and consequently the automatic heating due to friction become considerably less.

For further increasing this frictional effect, according to the invention the threads between the helical grooves are cut through. The result of this is that the mass flows back and is thus subjected for an increased period to the friction and therefore absorbs more heat. A further effect is that the mixing and working up of the layer is in itself increased. Instead of holes being provided in the threads of the worm the threads may in places be completely interrupted, in which case a worm may be used, portions of which are formed by a smooth drum without threads.

Figure 3:
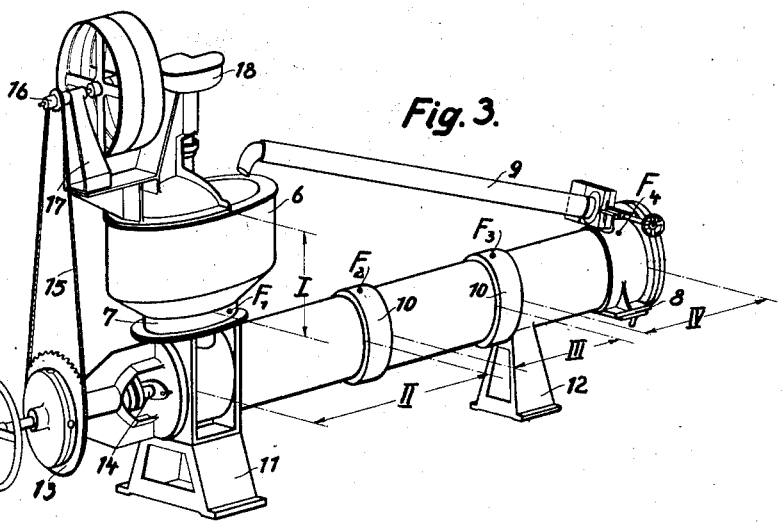
Fig. 3 is a perspective view of a tempering machine having a frictional end piece for reheating the mass by mechanical frictional work.

A tempering machine provided with such a frictional end piece is illustrated in Fig. 3. In this machine the conveying worm is cylindrical and the conveying path is divided into three zones II, III, IV. The charging hopper 6 for the chocolate mass will be referred to as zone I. The first three zones I–III form the cooling section in which the mass is cooled down below the temperature required for the next operation. The mass is charged into the hopper 6 at a temperature of from 40–70° C. In the branch 7 of the hopper 6 adjoining the zone II a temperature feeler $F_1$ is provided. This temperature feeler is in the form of a maximum and minimum thermometer and is so adjusted that the cooling jacket of the hopper 6 is swept through, when the chocolate mass has a temperature of from 40–45° by warm water at about 40°. In this case the first zone is thus heated for preventing the mass cooling below 40°. Should, however, the temperature of the mass increase above 45° the feeler $F_1$ puts a mixing valve into operation and allows cold water to flow into the cooling jacket of the hopper 6, in the manner hereinafter fully described. Even if this cooling is imperfect it nevertheless assists the general cooling down of the mass and prevents the mass from entering the zone II in which the actual cooling commences, at too high a temperature.

At the end of the zone II a further temperature feeler $F_2$ is provided. The cooling jacket of the zone II is swept through continuously by cold water coming straight from the mains in the direction in which the chocolate travels through the machine, that is to say, the cooling water enters the zone II at the beginning end and leaves at the other end. When the water enters at a temperature of 16° the chocolate mass is cooled down in this zone to about 32°, the water being heated up before leaving the zone II to a temperature of about 18–19°. The feeler $F_2$ is adjusted in such a manner that as soon as the chocolate mass at the end of zone II exceeds a temperature of 32°, the cooling action will be correspondingly increased in the manner hereinafter described.

In zone III the fine cooling takes place to obtain the desired, exact temperature. In this zone the mass is cooled down from 32° to 28°. The cooling medium passes through the jacket of the zone III in counter-flow, that is to say, it enters the end of the zone III at a temperature of about 20° and leaves at the beginning of the zone at a temperature of about 22°.

Up to the end of zone III the chocolate mass is thus continuously cooled down without being undercooled. At the feeler $F_3$ the mass will have assumed a temperature of 28°. For giving the chocolate its full flavor, the mass after being continuously cooled down to 28°, is heated up again by 1–1½°.

For this purpose the zone III is followed by the end piece IV. In the latter the mass is heated by the mechanical frictional work of the conveying ribs as they are pushed through it by an amount of from 1–2°. It is not necessary to provide this end piece with a water jacket. It has, however, been found of advantage to provide means for keeping the temperature of this end piece constant over its whole length and for preventing cooling down through radiation losses. For this purpose the end piece is provided either with an insulating jacket or with a water jacket. The water sweeps through this jacket with a temperature of 28°. For keeping this temperature constant a temperature feeler $F_4$ is provided, which, should the temperature rise owing to the internal friction, allows a corresponding quantity of cooler water to flow through. It is however generally only a question of temperature fluctuations in the nature of from ½° to 1° at the most. To the branch 8 of the end piece IV the distributing pipes leading to the next machines are connected and from this end piece IV a return flow pipe 9 leads to the charging hopper 6. Through this pipe a greater or smaller excess quantity of the mass depending on the requirements of the next machines flows back to the hopper 6. The rate of conveyance through the cooling portion and the end piece IV is set to the greatest demand at any time. This quantity can therefore be kept constant in spite of the irregular variations in the quantity required. An accurate temperature regulation is thus provided for.

Figure 5:
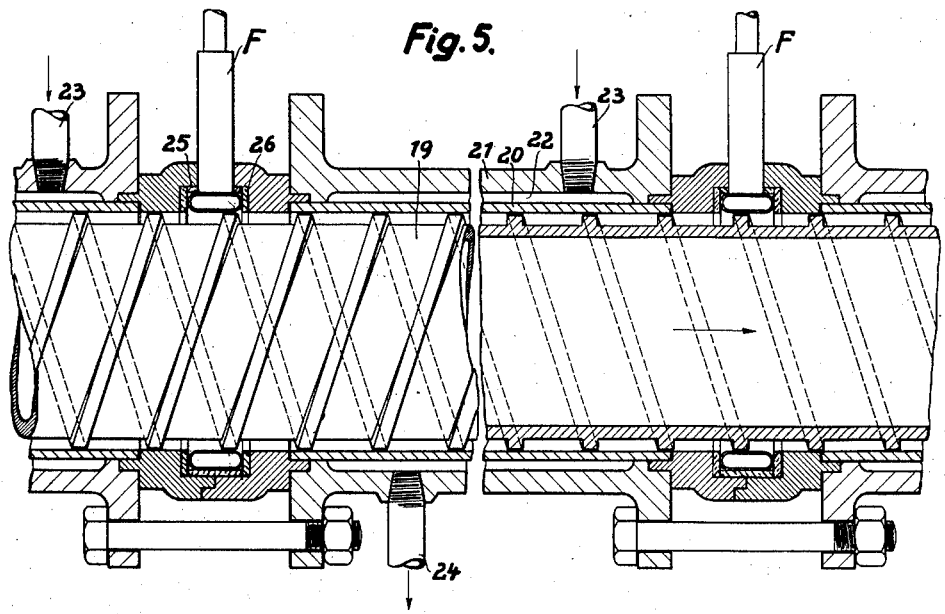
Fig. 5 is a longitudinal sectional view through the temperature changing cylinders shown in Fig. 3, and in larger scale.

The means for controlling the flow of the cooling or heating medium for the regulation of the temperature will be described as follows: As shown in Figure 5 the jacket of the conveying worm 19 comprises an inner cylinder 20 and an outer cylinder 21, the cylinders being so proportioned that there is a room 22 for the flow of the cooling or heating medium entering as at 23 into this room and leaving it as at 24. Between the cylinders of the zones there are arranged the temperature feelers F having an annular portion 25 closely surrounding the worm 19 and being provided in the usual manner with a suitable medium, such as carbonic acid, ether, petroleum and the like. The chocolate mass being moved in a very thin layer by the worm 19 the portion 25 of the feeler will be swept and thus directly influenced by the mass. For improving the accuracy of measuring the temperature the portion 25 may be surrounded by an insulating substance 26. An indicating device 27 is connected with the portion 25. This device comprises a pointer 28 moving over a circular scale and thereby indicating the temperature of the mass in every case. A second pointer 29 may be adjusted to the temperature which is not allowed to be exceeded. From the second pointer 29 a line 30 leads to a battery 31, and to a relay 32 and from this a line 33 to the indicating pointer 28. The relay serves to control a second circuit fed by a heavy current line 34. This circuit comprises a magnet 35 acting upon a valve 36 disposed in the line 37 for the cooling or heating medium leading to the socket 23 of the jacket.

A soon as the temperature has obtained the degree adjusted by the pointer 29, the pointer 28 is touching the pointer 29 so that the first circuit will be closed and thereby the second circuit by means of the relay 32. In consequence thereof, the magnet 35 will be excited and the valve 36 will be closed or opened according to the circumstances that is whether a heating or a cooling medium is controlled by the valve.

Figure 6:
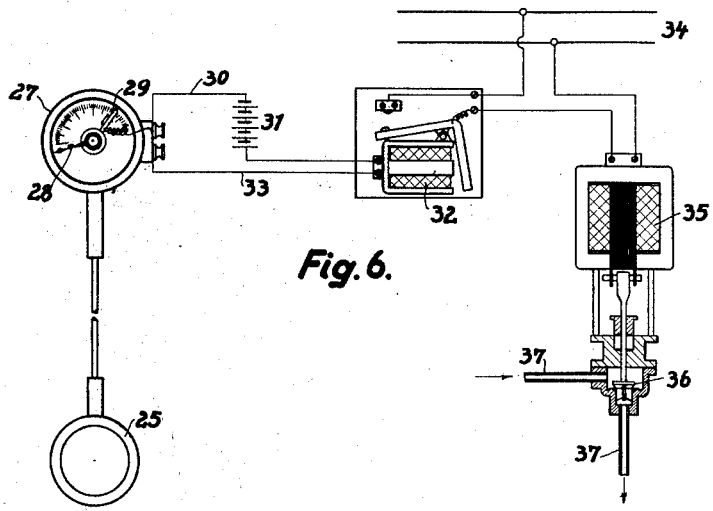
Fig. 6 is a diagrammatic view illustrating the means for the regulation of the temperature of the chocolate mass by controlling the supply of the cooling or heating medium to the jacket of the conveying worm.

By the arrangement of the feelers having the portion 25 partly or completely surrounding the cross-section of the flow of the chocolate mass the feelers are rendered more sensitive. A still further increasing of the accuracy of the regulation will be obtained by the direct influence of the chocolate mass as well as by providing for each zone one feeler. The arrangement according to Figure 6 is such that each feeler acts on that part of the jacket adjacent to it.

The hopper 6 together with the casing is mounted on two supports 11 and 12, as shown in Fig. 3. On the support 11 is also journalled a driving pulley 13 for the shaft 14 of the conveying worm which rotates inside the zones II, III, IV. The pulley 13 is driven by a chain or belt 15 from a shaft 16 which is journalled in a bracket 17 mounted on the hopper 6 and drives through gearing housed in a casing 18, a stirring arrangement for the hopper 6.

The immediate return of the excess amount to the charging hopper 6 provides the further advantage that the said excess amount is immediately subjected to treatment without being allowed to rest and separate.

What I claim is:

1. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, the casing being divided along said worm into cooling zones of gradually increasing temperatures in the direction of the delivery end of the machine.

2. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, the casing being divided along said worm into cooling zones of gradually increasing temperatures in the direction of the delivery end of the machine, said cooling zones being formed exteriorly to the chocolate mass.

3. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a charging hopper at the charging end of the machine and a return pipe at the discharging end of the machine for returning any excess of the maximum quantity required by machines following the tempering machine back to the hopper.

4. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a cooling jacket around the first part of the casing for cooling the mass below the temperature required at the delivery end and a heating jacket around the other part of the casing for reheating the cooled down mass.

5. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a cooling jacket around the first part of the casing, which is divided into a plurality of zones, for cooling the mass below the temperature required at the delivery end, and a heating jacket around the other part of the casing for reheating the cooled down mass.

6. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass and having a portion of the casing at the delivery end of the machine protected to prevent radiation of the heat generated by friction of the mass in the grooves of the worm thread.

7. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, and an insulating covering around a portion of the casing at the delivery end of the machine to prevent radiation of the heat generated by friction of the mass in the grooves of the worm thread.

8. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a jacket around a portion of the casing at the delivery end of the machine, adapted to be swept through by a medium of suitable temperature for preventing radiation of the heat generated by friction of the mass in the grooves of the worm thread.

9. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass and having the threads of the conveyer worm interrupted.

10. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, jackets for cooling the mass as it passes through the machine and for reheating it and means for indicating the temperature of the mass, the heat receptive part of the said means being arranged adjacent to the conveyer worm so as to be influenced directly by the chocolate mass.

11. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a cooling jacket around the first part of the casing, which is divided into a plurality of zones, the last part of the casing forming another zone for reheating the cooled down mass, and for each zone means for indicating the temperature of the mass, the heat receptive part of the said means being arranged adjacent to the conveyer worm so as to be influenced directly by the chocolate mass in the said zone.

12. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, a charging hopper at the charging end of the machine, a cooling jacket around the first part of the casing, which is divided into a plurality of zones, the last part of the casing forming another zone, for reheating the cooled down mass, and for each zone means for indicating the temperature of the mass, the heat receptive part of the said means being arranged adjacent to the conveyer worm so as to be influenced directly by the chocolate mass in the said zone, the first indicating means being mounted on the charging hopper.

13. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, and means for cooling the mass as it passes through the machine and for reheating it and means for indicating the temperature of the chocolate mass, the heat receptive part of said indicating means embracing the cross-section through which the chocolate mass passes so as to be influenced directly by the mass.

14. A machine for tempering chocolate mass, comprising in combination a casing the wall of which has a smooth inner surface and a conveyer worm adapted to rotate in the said casing with the thread of the worm in contact with the said smooth surface, the grooves of the thread being of very small depth for promoting a uniform conveying action and increasing the resistance to a backward flow of the mass, and means for cooling the mass at it passes through the machine and for reheating it and means for indicating the temperature of the chocolate mass, the heat receptive part of said indicating means partially embracing the cross-section through which the chocolate mass passes so as to be influenced directly by the mass.

OTTO LAUENSTEIN.